UNITED STATES PATENT OFFICE.

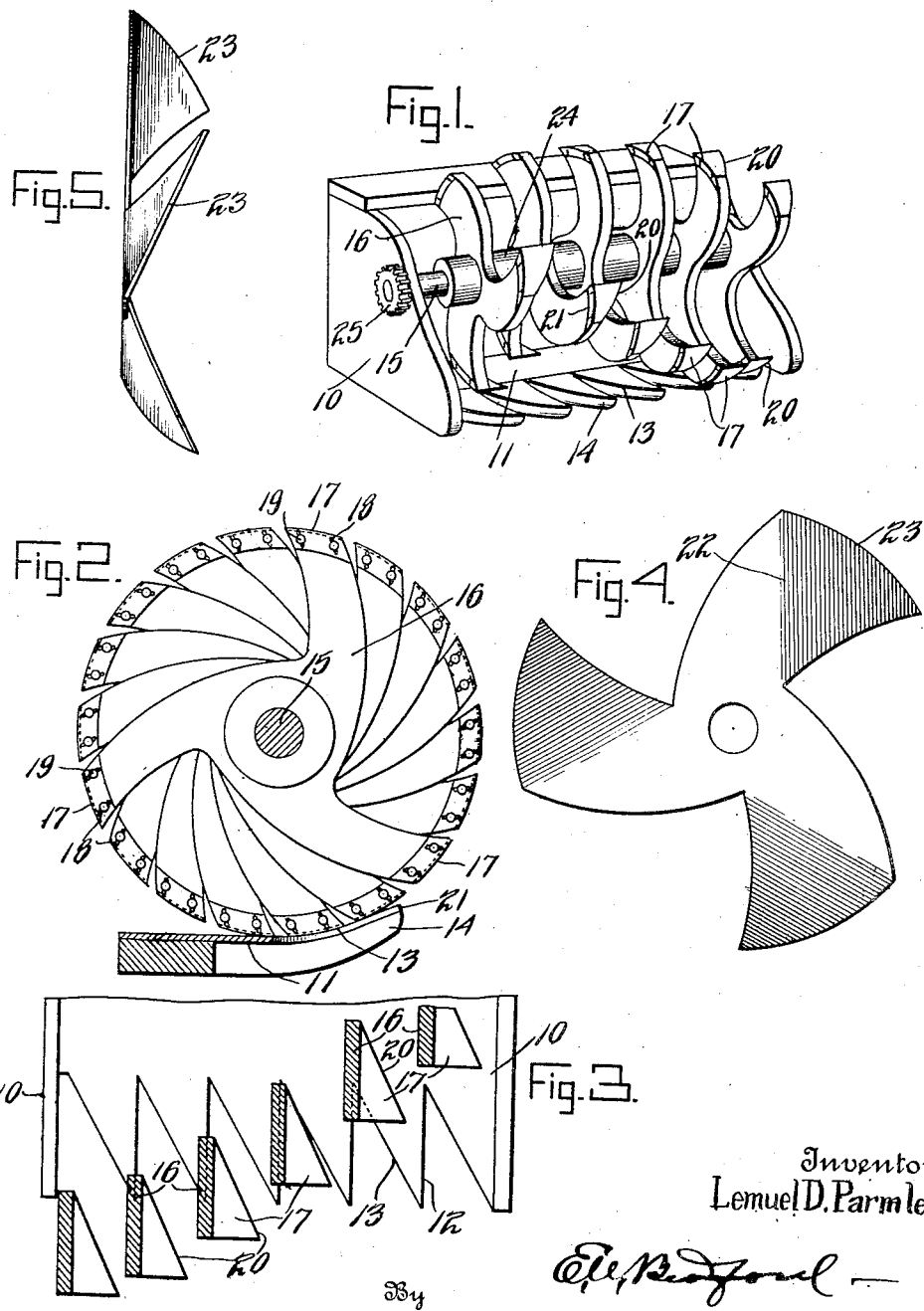

LEMUEL D. PARMLEY, OF WAYNESBORO, PENNSYLVANIA.

CUTTER FOR HARVESTERS.

1,370,352.   Specification of Letters Patent.   Patented Mar. 1, 1921.

Application filed June 15, 1920. Serial No. 389,161.

*To all whom it may concern:*

Be it known that I, LEMUEL D. PARMLEY, a citizen of the United States, residing at Waynesboro, in the county of Franklin and State of Pennsylvania, have invented certain new and useful Improvements in Cutters for Harvesters, of which the following is a specification.

This invention relates to cutters for harvesting machines and has for an object to provide a cutter embodying a ledger plate and a reel member, the reel member carrying knives of improved form coöperating with the ledger plate.

A further object of the invention is to provide a ledger plate and rotating cutter having improved co-action, of a shearing nature, between the plurality of separate cutters carried by the reel and the ledger plate.

With these and other objects in view the invention comprises certain novel elements, parts, units, combinations and arrangements as will be hereinafter more fully described and claimed.

Referring to the accompanying drawings, which are made a part hereof and on which similar reference characters indicate similar parts, Figure 1 is a perspective view of the improved cutter, Fig. 2 a view of the cutter in end elevation, Fig. 3 a diagrammatic view of the co-action between the cutters of the reel and the ledger plate, Fig. 4 a view of an improved type of rotor in side elevation, and Fig. 5 a view in edge elevation of the type of rotor shown at Fig. 4.

The supporting frame work, wheels and propelling structure carrying the improved cutter, which forms the subject matter of this application, is wholly immaterial to the invention and is disclosed diagrammatically at 10 and is not intended in any way to limit the construction, it being understood that the cutter may be mounted upon supporting frame work, wheels and the like, of any convenient type found desirable for the purpose to which the cutter is to be applied.

Carried in any convenient manner upon the frame is a ledger plate 11 notched so that one side of the notch, as at 12, is substantially perpendicular to the longitudinal axis of the ledger plate 11 while the other side of the notch 13 is inclined to the first mentioned side forming angular points or fingers 14. No means is shown in the drawing for the adjustment of the ledger plate, this being such a well known mechanical expedient in the art as not to require illustration.

Conveniently journaled above the ledger plate is a shaft 15, the journaling in the frame 10 being of any usual and ordinary type for the purpose.

Mounted upon the shaft 15 are a plurality of spider members 16, the arms of which are generally radial, although in practice it is found desirable to curve them, as shown more particularly in Figs. 1 and 2. The number of such spiders, which together form the reel, correspond to the number of teeth in the ledger plate and each leg of each spider carries a knife 17. As shown at Fig. 2 the knives are provided with slots 18 which, together with the screws 19, provide for adjustment of the knives relative to the spider and consequently relative to the axis of rotation. The knives 17 have inclined cutting edges 20 the angle of which approaches the angle of the cutting edge 13 of the ledger plate, but as will be noted from Fig. 3 does not wholly correspond thereto forming with the cutting edge 13 a shear cut, illustrated in said Fig. 3.

It will also be noted that the knives 17 are provided with a non-cutting side 21 which engages upon the top of one of the teeth of the ledger plate so that the moving knife always has a bearing surface upon the ledger plate when in action. From Fig. 2 it will be noted that the forward end of the teeth are bent slightly out of the circumference of the rotation of the knives 17, as indicated at 21, whereby the knives 17 will engage upon the teeth without danger of the cutting edges locking. The sliding engagement of the knives 17 upon the teeth of the ledger plate, as just described, is very important to the successful operation of the device as it prevents the locking of the cutting edges, while at the same time permitting of close contact between the rotating knives and the stationary knives.

Instead of employing the spiders and the knives as separately constructed and later organized, Fig. 4 shows one of the spiders cut and stamped directly from sheet metal, curved from the plane at 22, forming a cutting edge 23 co-acting with the cutting edge 13 in exactly the same manner as the cutting edge 20 of the knives 17. In either case the spiders are secured upon the shaft 15 by the use of collars or other spacers 24. Also preferably the spiders will be staggered so that only one of the knives will be cutting at once, the arrangement being shown diagrammatically at Fig. 3, it being understood that Fig. 3 actually does not illustrate any possible condition but only the sequence of cutting of the rotor upon, and relative to, the ledger plate. The staggered relation is also shown at Fig. 1 in perspective and Fig. 2 in end elevation.

Connected and associated with any approved type of driving mechanism and supporting structure, as for instance the structure of the usual and ordinary type of lawn mower, wherein the internally geared traction wheels would engage the pinion 25, the shaft 15 would be driven driving therewith the several spiders of either type, bringing the cutting edges at the extremity of the spider legs successively into shearing relation to the cutting edges of the ledger plate whereby the spiders associated in the organized structure serve as a reel for discharging the severed grass or other material. By reason of the formation of the spiders with the forward ends of the cutting members pointed, tall grass or the like may be cut with the device as the rotating members will pass between the stalks of grass and sever them only when the stalks have been brought into engagement between the cutting edges of the teeth of the ledger plate. The device will therefore operate upon tall grass or the like which resists cutting by the usual rotating reel cutter operating in conjunction with a straight or conventional ledger plate.

Having thus fully described my said invention what I claim as new and desire to secure by Letters Patent, is:

1. A cutter for a harvesting machine comprising, a ledger plate having teeth one side of which is arranged for cutting and a rotor comprising spaced arms having knives adjustably mounted upon their extremities and positioned to ride upon the teeth of the ledger plate and co-act with the cutting edges.

2. A cutter for harvesting machines comprising, a ledger plate having pointed teeth, one side of which is a cutting edge and the opposite side a non-cutting edge, a rotor comprising radial arms having circumferentially curved knives mounted upon the ends of the arms the knives positioned to move rotatably in sliding engagement with non-cutting side of the teeth and to move into shearing relation with the cutting side of the teeth.

3. A cutter for harvesting machines comprising, a ledger plate having teeth, one side of which is a cutting edge, and the opposite side a non-cutting edge, and the rotor comprising radial arms provided at their extremity with arcuate plates having edges adapted to slide upon and along the non-cutting edge of the teeth and a cutting edge proportioned to move into shearing relation to the cutting edge of the teeth, the arcuate plates being disposed at all times above the ledger plate.

4. A cutter for harvesting machines comprising, a ledger plate having arcuate teeth and a rotor having radial arms provided at their extremities with arcuate cutting blades complementary with the arcuate ledger teeth and positioned to rotatably and slidably engage upon the upper surface of one of the teeth of the ledger plate and to move into shearing engagement with a proximate tooth.

5. A cutter for harvesting machines comprising, a ledger plate having pointed teeth and a rotor carrying spaced cutting knives curved to move in sliding engagement each along one of the teeth of the ledger plate and into shearing association with the proximate side of a juxtaposed tooth, the cutting knives being at all times disposed above the ledger plate.

6. A cutter for harvesting machines comprising, a ledger plate having teeth, one edge of which is non-cutting and substantially in alinement with the line of travel and the opposite side a cutting edge disposed at an angle relative thereto, a rotor, having radially extending arms, a knife mounted upon the extremity of each arm positioned to engage and travel above and along the non-cutting edge of the tooth and provided with an angularly disposed cutting edge positioned to move into shearing coaction with the cutting edge of the juxtaposed tooth.

7. A cutter for harvesting machines comprising, a ledger plate having teeth, one side of which is non-cutting and substantially parallel to the line of travel and the opposite side a cutting edge and disposed at an angle to the first mentioned side and a rotor having a plurality of radially adjustable knives disposed entirely above the ledger plate and positioned for shearing coaction with the cutting angular edges of the teeth.

8. A cutter for harvesting machines comprising, a substantially horizontal ledger plate having teeth one side of which is non-cutting and in substantial parallelism with the path of travel and the other side cutting edges inclined to the first mentioned sides and a rotor provided with radial arms having cutting members mounted upon the extremities of the arms adapted to coact with the cutting edges of the inclined teeth.

9. In a cutter for harvesting machines, a ledger plate provided with a plurality of teeth, one side of which is in substantial parallelism with the path of travel and the opposite side inclined thereto producing a point, a rotor having radial arms, arcuate cutters adjustably mounted upon the extremities of the arms, said cutters having cutting edges formed complementary with the inclined sides of the ledger plate teeth but at a slight angle therewith to produce a shearing effect as the cutters move into shearing relation with the teeth of the ledger plate.

10. In a cutter for harvesting machines, a rotor having arms and adjustable cutting knives carried by the arms and upon the extremities thereof, one side of the knives coinciding substantially with the circumference of rotation and the opposite side being inclined thereto meeting the first mentioned side at a point.

11. In a cutter for harvesting machines, a rotor provided with a plurality of radially extending arms, a knife carried by an arm, said knife lying substantially in the cylinder of rotation and having a non-cutting edge substantially parallel with the axis of rotation of the rotor and a cutting edge disposed at an angle to the first mentioned side and meeting the said first mentioned side at a point.

12. In a cutter for harvesting machines, a rotor comprising a plurality of radially extending arms and a cutting edge adjustably mounted upon the extremity of each arm disposed in the cylinder of rotation and at an angle to the circumference.

In witness whereof I have hereunto set my hand and seal at Waynesboro, Pennsylvania this 10th day of June, A. D. nineteen hundred and twenty.

LEMUEL D. PARMLEY. [L. S.]

Witnesses:
H. E. CRAIG,
JOHN A. POTTER.